Figure 1:
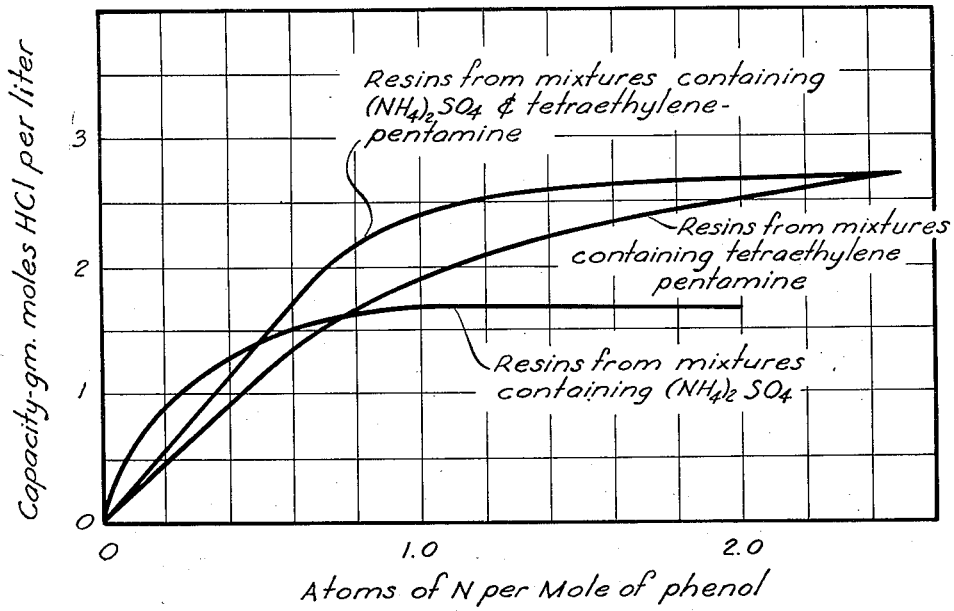

March 27, 1951  W. C. BAUMAN ET AL  2,546,938
ION EXCHANGE RESINS AND PROCESS OF TREATING
A SOLUTION OF AN ACID IN A LIQUID
IONIZING MEDIUM TO REMOVE ANIONS
Filed May 23, 1946

INVENTORS.
William C. Bauman,
BY George Beal Heusted

Griswold & Burdick
ATTORNEYS

Patented Mar. 27, 1951

2,546,938

UNITED STATES PATENT OFFICE 2,546,938

ION EXCHANGE RESINS AND PROCESS OF TREATING A SOLUTION OF AN ACID IN A LIQUID IONIZING MEDIUM TO REMOVE ANIONS

William C. Bauman and George Beal Heusted, Midland, Mich., assignors to The Dow Chemical Company, Midland, Mich., a corporation of Delaware Application May 23, 1946, Serial No. 671,872

13 Claims. (Cl. 23—139)

This invention concerns certain new ion exchange resins and a method of making the same. It also concerns a process wherein said resins are employed for the absorption of anions from solutions of acids in ionizing media.

Cheetham et al., in U. S. Patent 2,341,907, have disclosed ion exchange resins which are prepared by reacting together a phenol, formaldehyde and a non-aromatic amine, particularly an alkylene-polyamine or polyalkylene-polyamine. Resins prepared from such starting materials have good anion exchange properties, but are expensive due to the cost of the amine starting materials.

In a copending application, Serial No. 671,871, filed concurrently herewith, we have disclosed that, by heating a mixture of a monohydric phenol, formaldehyde and an ammonia source-material, e. g. a solution of ammonia or an ammonium salt, to a reaction temperature in the presence of an ionizing type of liquid media, and completing the reaction under acidic conditions, a water-insoluble resin may be formed which is rich in basic nitrogen groups and possesses excellent anion exchange properties. The starting materials employed in preparing such resins are readily available at moderate costs. Hence, such ion exchange resins can economically be manufactured.

We have now found that, by reacting a monohydric phenol and formaldehyde with a mixture of an ammonia source-material and an alkylene-polyamine or polyalkylene-polyamine under conditions otherwise similar to those employed in our aforementioned copending application, Serial No. 671,871, water-insoluble resins rich in basic nitrogen groups are obtained which have anion absorptive capacities considerably higher than those of resins produced under similar conditions, except for the use of either an ammonia source-material, or an alkylene-polyamine, or polyalkylene-polyamine alone as the nitrogen-containing reactant. However, in order to obtain resinous products of high anion absorptive capacity, and having other chemical and physical properties rendering them suitable for use in anion exchange processes, it is important that the resins be prepared under the conditions hereinafter described.

The resins of the present invention are prepared by reacting together in the presence of an ionizing medium such as water, alcohol, or aqueous alcohol, 1 molecular equivalent of a monohydric phenol which initially is free of substituents in at least two of the positions ortho and para to the phenolic hydroxyl group, at least 2, and usually from 2 to 3.5, molecular equivalents of formaldehyde, and a mixture of an ammonia source-material and an aliphatic alkylene-polyamine or aliphatic polyalkylene-polyamine in amount containing from 0.5 to 2, preferably from 0.5 to 1.2, gram atomic weights of nitrogen per gram molecular weight of the phenolic reactant, and completing the resin-forming reaction under acidic conditions.

The ammonia source-material and the alkylene-polyamine or polyalkylene-polyamine are used in relative proportions such that from 10 to 80 per cent, and preferably from 30 to 70 per cent, of the total nitrogen-content of these starting materials is supplied by the ammonia source-material. Resins of highest anion-absorptive capacity are obtained from reaction mixtures of a given total nitrogen-content when approximately half of the total nitrogen is supplied by each of the two kinds of nitrogen-containing reactants. It so happens that in the preparation of an alkylene-polyamine, or a polyalkylene-polyamine, by reaction between an olefine chloride, e. g. ethylene chloride or propylene chloride, etc., and an excess of an aqueous ammonia solution, there is obtained a mixture of such amines and an ammonium salt in relative proportions containing about equal amounts of chemically combined nitrogen. The crude mixture of these products is readily preparable at low cost and constitutes an economical source of the mixture of nitrogen-containing compounds used in production of the resinous anion exchange agents of this invention.

Use of the mixture of nitrogen-containing starting materials in amount such as to supply at least 0.5 gram atomic weight of nitrogen per gram molecular weight of the phenolic reactant is necessary in order to obtain a resinous product having a satisfactorily high anion absorptive capacity. Use of these same starting materials in amount containing a total of more than 2 gram atomic weights of nitrogen per mole of the phenolic reactant usually results in formation of a resin which tends to swell excessively upon change in the pH value of liquids contacted therewith. The employment of at least 2 molecular equivalents of formaldehyde per mole of the phenolic reactant is necessary in order to obtain a hard water-insoluble resinous product of sufficient strength, abrasion resistance, and resistance to swelling upon change in the pH value of liquids contacted therewith for use in anion exchange processes. The molecular ratio of formaldehyde to the phenolic reactant may be higher than the preferred ratios of from 2 to 3.5, but the use of larger proportions of formaldehyde is unnecessary and sometimes results in formation of resinous products which undergo excessive swelling during use in an ion exchange process.

Figure 2:
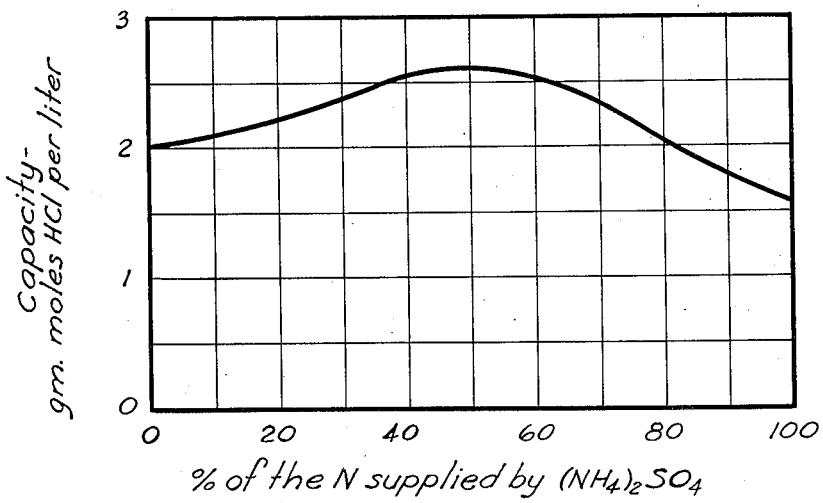

The accompanying drawing illustrates certain of the advantages of employing a mixture of an ammonia source-material and an alkylene-polyamine or polyalkylene-polyamine, rather than either such agent alone, in the preparation of resinous anion exchange agents. Figure 1 of the drawing is a graph showing the changes in absorptive capacity (expressed as gram moles of hydrochloric acid per liter of a water-wetted bed of granular resin) with change in the nitrogen-content of certain resinous products. The resins dealt with in Figure 1 were prepared by the reaction of phenol and formaldehyde with ammonium sulphate alone, tetraethylene-pentamine alone, and a mixture of ammonium sulphate and tetraethylene-pentamine in relative proportions containing equal amounts of nitrogen. It will be noted that the resins prepared from reaction mixtures containing between 0.5 and 2 gram atomic weights of nitrogen per gram molecular weight of phenol were of highest absorptive capacity when the nitrogen-content of the reaction mixture was supplied by a mixture of ammonium sulphate and tetraethylene-pentamine rather than by either ammonium sulphate or tetraethylene-pentamine alone. Figure 2 of the drawing shows that resinous products prepared from mixtures of 1 molecular equivalent of phenol, 2.5 molecular equivalents of formaldehyde, and ammonium sulphate and tetraethylene-pentamine in amounts such as to supply 1 gram atomic weight of nitrogen per mole of the phenol, were of maximum absorptive capacity when approximately half of the nitrogen-content of the starting mixture was supplied by each of the two nitrogen-containing starting materials, i. e. ammonium sulphate and tetraethylene-pentamine.

Examples of ammonia source-materials which may be employed in preparing the resins are ammonia itself, aqueous ammonium hydroxide solutions, ammonium salts such as ammonium sulphate, ammonium chloride, ammonium acetate, ammonium sulphamate, etc., and compounds, such as sulphamic acid, which are readily hydrolyzed by water to form ammonia in situ. Examples of aliphatic alkylene-polyamines and polyalkylene-polyamines which may may be used are ethylene-diamine, diethylene-triamine, triethylene-tetramine, tetraethylene-pentamine, propylene-diamine, dipropylene-triamine, tripropylene-tetramine, butylene-diamine, or dibutylene-triamine, etc. Mixtures of two or more ammonia source-materials, or of two or more of the polyamines may, of course, be used. If desired, the polyamines may be used in the form of salts, e. g. hydrochlorides or sulphates, thereof.

Phenol itself is preferably employed in preparing the anion exchange agents, but other monohydric phenols initially free of substituents in at least two of the positions ortho and para to the hydroxyl group, such as cresol, ethyl-phenol, propyl-phenol, butyl-phenol, or chloro-phenol, etc., or mixtures of two or more of such phenolic reactants can be used.

The formaldehyde reactant is usually employed in the form of an aqueous formaldehyde solution, e. g. of 30 per cent concentration, or higher, in which case the water-content of said solution serves as an ionizing medium for the resin-forming reaction. However, the formaldehyde may be added in gaseous form, or in the form of its solid polymers such as paraformaldehyde. Water is preferably used as the liquid medium for the reaction, but other ionizing media such as alcohol, or aqueous alcohol solutions, can be used.

In preparing the anion exchange agents, a mixture of the aforementioned reactants in the proportions given, is heated together with water or other ionizing medium usually at temperatures between 70° and 100° C., although the reaction can be carried out at somewhat lower or higher temperatures. The reaction may be initiated under neutral, alkaline, or moderately acidic conditions, provided the reacting materials are retained in solution and the reaction is completed in the presence of an acid. The acid necessary to render the mixture acidic may be added as such, or be formed in situ, e. g., by employing salts of ammonia and the alkylene-polyamine reactant as starting materials. During the reaction, such salts undergo decomposition and the ammonia or amine-content thereof reacts with the phenol and formaldehyde to form the resinous product with the result that an acid corresponding to the salt is formed in situ within the mixture. The acid thus formed apparently catalyzes further reaction of the ammonia or amine with the phenol and formaldehyde and causes more rapid solidification and hardening of the resin than would otherwise occur. In general, an increase in the proportion of acid in the mixture results in an increase in the rate of solidification and hardening of the product.

In practice, the reaction is usually accomplished by heating an aqueous solution of the starting materials until the mixture becomes viscous, and then cooling, e. g. to 50° C. or lower, and adding an acid in amount sufficient to render the mixture strongly acidic. Any strong acid may be used to acidify the mixture, but certain acids, such as acetic acid, phosphoric acid, and mixtures of acetic acid with phosphoric or sulphuric acid, have less tendency to cause coagulation of the partially formed resinous products than do others, e. g. hydrochloric acid alone or sulphuric acid alone. A mixture of about 20 per cent by weight acetic acid and 80 per cent sulphuric acid is particularly suitable for acidification of the mixture without causing premature coagulation of the product, and is preferred. The acid is usually added in amount sufficient to give the reaction mixture a degree of acidity greater than that represented by a pH value of zero.

After acidification, the reaction is continued, e. g. at temperatures of from 70° to 100° C., until a solid water-insoluble resinous gel is formed. The product is ground, or otherwise pulverized, usually to form particles of from 20 to 60 mesh size. The granular material may be used directly as an anion exchange agent or it may first be dried, e. g. by heating at temperatures in the order of from 100° to 150° C.

In addition to the reactants hereinbefore specified, other materials may be present in the mixture from which the ion exchange resin is formed. For instance, phenolic compounds other than those required by the invention, e. g. polyhydric phenols or monohydric phenols containing substituents in two of the positions ortho and para to the hydroxyl radical, may be present in amount corresponding to less than 10 per cent of the weight of the phenolic reactant required. Usual fillers, such as asbestos fibers, or diatomaceous earth, etc., may be incorporated in minor amount for purpose of increasing the porosity of the resinous product and the readiness with which the latter may exchange anions. However, the preferred resins of the invention, i. e. those prepared from reaction mixtures containing an alkylene-polyamine or polyalkylene-polyamine in amount providing 30 per cent or more of the total nitrogen-content of the starting materials, are sufficiently porous and reactive to permit utilization of nearly their full anion absorptive capacities in a water-purification process carried out in continuous manner, and incorporation of a filler therewith is not required. The addition of a filler to an anion exchange resin reduces the total anion absorptive capacity per cubic foot of the granular product, but it sometimes causes an increase in the anion exchange capacity available for use in a water-purification process. Although the resinous product may be modified in the ways just mentioned, it is important that the reactants and reaction conditions hereinbefore specified be employed in preparing the resin.

The resinous product may be employed to absorb anions from solutions of acids, or of acids and salts, in ionizing media such as water or alcohol. It is particularly effective in absorbing mineral acids such as hydrochloric, sulphuric, hydrofluoric, or fluosilicic acid, etc., from aqueous solutions thereof. Usually, the absorption is effected by passing the solution through a bed of the granular resin, but it may be accomplished by other procedures known to the art. The new anion exchange resins may be used in conjunction with conventional cation exchange agents to effect substantially complete purification of water which initially contains acids, salts, or alkalies. In such complete purification operation, the impure water is passed first through a bed of the acidic form of a granular cation exchange agent, whereby positive ions are absorbed from the water leaving the latter substantially free of impurities other than acids. The water is then passed through a bed of the granular anion exchange agent, which combines chemically with, and thus absorbs, the acids.

After having absorbed its capacity of anions during use in such ion exchange process, the anion exchange resin may be regenerated by treatment with an aqueous solution of an alkali such as ammonium hydroxide, sodium hydroxide, potassium hydroxide, sodium carbonate, or potassium carbonate, etc. When an unstable acid such as fluosilicic acid, susceptible to decomposition by strong alkalies, has been absorbed by the resin, it is sometimes advisable to displace the unstable acid from the resin by treatment of the latter with a relatively stable aqueous acid, such as hydrochloric or sulphuric acid, prior to treatment of the resin with an alkali. The regenerated resin is suitable for reemployment as an anion exchange agent.

The following examples describe certain ways in which the principle of the invention has been applied, but are not to be construed as limiting the invention.

EXAMPLE 1

In each of a series of experiments, a resinous product was prepared by forming a mixture of 1 molecular equivalent of phenol, 2.5 moles of formaldehyde which was added in the form of an aqueous formaldehyde solution of 37 per cent by weight concentration, and the nitrogen-containing materials indicated in the following Tables I-III in the relative proportions given. The experiments differed from one another as to the kind and proportion of nitrogen-containing material used in forming the resin. The mixture was heated under reflux at temperatures between 70° and 100° C. for about 1 hour, i. e. until it was quite viscous. It was then cooled to about room temperature and acidified by adding with stirring approximately 0.25 chemical equivalent of acetic acid per mole of the phenol starting material and then a mixture of 80 per cent sulphuric acid and 20 per cent acetic acid in amount corresponding to approximately 1 chemical equivalent of the acid mixture per mole of phenol used as a starting material. The acidified mixture was heated at temperatures of from 80° to 100° C. until a solid water-insoluble resinous mass was formed. The resin was ground to particles of from 20 to 60 mesh size and the granular material was dried by heating the same at 150° C. for 3 hours. Each resin was thereafter immersed in an excess of a dilute aqueous ammonium hydroxide solution for about 3 hours so as to convert the same to its basic form. It was then washed with water until substantially free of ammonia and inorganic salts and immersed in water alone. The volume of the immersed bed of granular resin was noted. A measured amount of hydrochloric acid, sufficient to render the mixture acidic, was added and the mixture was permitted to stand for 3 hours. Thereafter, excess acid was removed by drainage and washing with water and the amount thereof was measured. From the amount of acid added to the bed of resin and the excess acid thereafter removed, the quantity of acid absorbed and retained in chemical combination with the resin was calculated. The anion absorptive capacities thus determined are expressed, in the following tables, in terms of the gram molecular weights of hydrochloric acid absorbed per liter of the water-wetted bed of granular resin. Table I deals with resins prepared as just described from mixtures containing an ammonia source-material as the nitrogen-containing reactant. It names the ammonia source-material and gives the proportion used as gram atomic weights of nitrogen therein per gram molecular weight of the phenol reactant. It also gives the anion absorptive capacity of each product. Table II gives similar information regarding resins prepared from mixtures containing tetraethylene-pentamine as the nitrogen-containing starting material. Table III gives such information concerning resins prepared as described above from reaction mixtures which contained both ammonium sulphate and tetraethylene-pentamine as the nitrogen-containing starting materials, the two agents just named being used in relative proportions such as to contain equal amounts of nitrogen.

*Table I*

| Run No. | NH₃ Source Material | | Capacity Moles HCl per Liter of Resin |
|---|---|---|---|
| | Kind | Amount as Atomic Weights of N per mole of Phenol Reactant | |
| 1 | $(NH_4)_2SO_4$ | 0.5 | 1.42 |
| 2 | $(NH_4)_2SO_4$ | 1.125 | 1.70 |
| 3 | $NH_4OH$ | 2.0 | 1.66 |

Table II

| Run No. | Atomic Weights of N per Mole of Phenol | Capacity Moles HCl/Liter of Resin |
|---|---|---|
| 1 | 0.25 | 0.55 |
| 2 | 0.66 | 1.5 |
| 3 | 1.125 | 2.0 |
| 4 | 1.375 | 2.2 |
| 5 | 2.5 | 2.7 |

Table III

| Run No. | Atomic Weights of N per Mole of Phenol | Capacity Moles HCl/Liter of Resin |
|---|---|---|
| 1 | 0.5 | 1.42 |
| 2 | 1.125 | 2.5 |
| 3 | 1.5 | 2.53 |
| 4 | 1.75 | 2.65 |
| 5 | 2.5 | 2.71 |

The data presented in the above tables was used as a basis for the graph shown as Figure 1 of the drawing. In the graph, the horizontal axis gives the gram atomic weights of chemically combined nitrogen per mole of phenol in the reaction mixture used in preparing each resin and the vertical axis gives the anion absorptive capacities of the resins. All curves start from a zero value, since the resins containing no nitrogen would have no anion absorptive capacity.

EXAMPLE 2

In each of several experiments, resins were prepared from mixtures containing 1 molecular equivalent of phenol, 2.5 moles of formaldehyde, and a mixture of ammonium sulphate and tetraethylene-pentamine in amount containing a total of 1 gram atomic weight of nitrogen per gram molecular weight of the phenol. The relative proportions of the two nitrogen-containing starting materials were varied from one experiment to the next, but the ratio of total nitrogen in said starting materials to the phenolic reactant was the same in all of the experiments. The resins were prepared and tested to determine their anion absorptive capacities by procedure similar to that described in Example 1. During determination of the anion absorptive capacity of each resin by treating a water-immersed bed of the basic form of the granular resin with hydrochloric acid, the per cent by which the resin bed swelled due to treatment with the acid was noted. Table IV identifies each resin by giving the per cent of the total nitrogen-content of the mixture used in making the same which was supplied by the ammonium sulphate component of the starting mixture. It also gives the anion absorptive capacity of each resin, in terms of the gram molecular equivalents of hydrochloric acid absorbed per liter of the water-wetted bed of granular resin, and the per cent by which the bed of resin swelled upon treatment with the acid.

Table IV

| Run No. | Per Cent of the N Supplied by (NH₄)₂SO₄ | Resin Properties | |
| | | Capacity Moles HCl per Liter of Resin | Per Cent Swelling |
|---|---|---|---|
| 1 | 0 | 2.03 | 14 |
| 2 | 25 | 2.31 | 19 |
| 3 | 50 | 2.59 | 22 |
| 4 | 75 | 2.21 | 20 |
| 5 | 100 | 1.58 | 16 |

The anion absorptive capacity values just given are the basis for the graph shown as Figure 2 of the drawing. The resins prepared from reaction mixtures having a given total nitrogen-content were of maximum anion absorptive capacity when approximately equal amounts of the nitrogen were supplied by the two kinds of nitrogen-containing starting materials, i. e. an ammonium salt and a polyalkylene-polyamine. The percentage swelling values given in the above table are not excessively high for anion exchange resins.

By procedure similar to that described in Example 1, anion exchange agents of high anion absorptive capacity may be prepared from aqueous solutions of each of the following mixtures: a mixture of 1 molecular equivalent of phenol, 2.5 moles of formaldehyde, 0.125 mole of ammonium sulfamate and 0.15 mole of tetraethylene-pentamine; a mixture of 1 molecular equivalent of phenol, 2 moles of formaldehyde, 0.5 mole of ammonium chloride and 0.25 mole of ethylene diamine; a mixture of 1 molecular equivalent of cresol, 3.5 moles of formaldehyde, 0.5 mole of sulphamic acid and 0.5 mole of dipropylene-triamine; etc.

Other modes of applying the principle of the invention may be employed instead of those explained, change being made as regards the method or anion exchange agents herein disclosed, provided the steps or ingredients stated by any of the following claims or the equivalent of such stated steps or ingredients be employed.

We therefore particularly point out and distinctly claim as our invention:

1. A solid resinous condensation product formed by reacting together, in the presence of an ionizing solvent and at temperatures between about 70° and about 100° C., 1 molecular equivalent of a monohydric phenol which, of itself, is free of substituents in at least two of the positions ortho and para to the hydroxyl group, between 2 and 3.5 molecular equivalents of formaldehyde, and both an ammonia source-material and a member of the class consisting of alkylene-polyamines and polyalkylene-polyamines in amounts such as to contain a total of between 0.5 and 2 gram atomic weights of nitrogen per gram mole of the phenol and in relative proportions such that between 10 and 80 per cent of the total nitrogen-content is provided by the ammonia source-material, and completing the resin-forming reaction under acidic conditions.

2. A resinous condensation product, as set forth in claim 1, wherein the phenolic reactant employed in forming said product is phenol.

3. A resinous condensation product, as set forth in claim 1, wherein the phenolic reactant employed in forming the resin is phenol and the ammonia source-material is an aqueous ammonium hydroxide solution.

4. A resinous condensation product, as set forth in claim 1, wherein the phenolic reactant employed in forming the resin is phenol and the ammonia source-material is sulfamic acid.

5. A solid resinous condensation product formed by reacting together, in the presence of an ionizing solvent and at temperatures between about 70° and about 100° C., 1 molecular equivalent of phenol, between 2 and 3.5 moles of formaldehyde, and both an ammonia source-material and a member of the class consisting of alkylene-polyamines and polyalkylene-polyamines in amounts such as to contain a total of between 0.5 and 1.2 gram atomic weights of chemically combined nitrogen per gram molecular weight of the phenol and in relative proportions such that between 30 and 70 per cent of the total nitrogen-content is provided by the ammonia source-material.

6. A resinous condensation product as set forth in claim 5, of a mixture of phenol, formaldehyde, an ammonium salt and a polyethylene-polyamine.

7. A resinous condensation product, as set forth in claim 5, of a mixture of phenol, formaldehyde, ammonium sulphate and tetraethylene-pentamine.

8. A method of making a solid water-insoluble resinous anion exchange agent which comprises reacting together, in the presence of an ionizing solvent and at temperatures between about 70° and about 100° C., 1 molecular equivalent of a monohydric phenol which initially is free of substituents in at least two of the positions ortho and para to the hydroxyl group, at least 2 molecular equivalents of formaldehyde, and both an ammonia source-material and a member of the class consisting of alkylene-polyamines and polyalkylene-polyamines in amounts such as to contain a total of between 0.5 and 2 gram atomic weights of chemically combined nitrogen per gram molecular weight of the phenol, and in relative proportions such that between 10 and 80 per cent of the total nitrogen-content is supplied by the ammonia source-material, and completing the resin-forming reaction under acidic conditions.

9. A method, as described in claim 8, wherein the phenolic reactant is phenol and acid is added during the reaction.

10. A method, as described in claim 8, wherein the phenolic reactant is phenol, between 2 and 3.5 molecular equivalents of phenol are employed per mole of the phenol, the ammonia source-material is an ammonium salt, the ammonium salt is employed in a proportion such as to provide between 30 and 70 per cent of the total nitrogen-content of the reaction mixture, and an acid is added during the reaction.

11. A method, as described in claim 8, wherein the phenolic reactant is phenol, between 2 and 3.5 molecular equivalents of formaldehyde are employed per mole of the phenol, the ammonia source-material is an ammonium salt, the other nitrogen-containing reactant is a polyethylene-polyamine, the nitrogen-containing reactants are present in amount containing a total of between 0.5 and 1.2 gram atomic weights of chemically combined nitrogen per gram mole of the phenol, the ammonium salt is present in amount corresponding to between 30 and 70 per cent of the total nitrogen-content of the reaction mixture, and wherein a mixture of a major proportion by weight of sulphuric acid and a minor proportion of acetic acid is added during the reaction.

12. A process of treating a solution of an acid in a liquid ionizing medium to remove anions from the solution, which comprises contacting the solution with the basic form of the resin described in claim 1.

13. A process of treating an aqueous solution of an acid to remove anions therefrom which comprises passing said solution through a bed of a basic granular form of the resin described in claim 5 until an increase in the anion content of the effluent water occurs, and thereafter treating the resin with an aqueous alkali solution to remove anions therefrom.

WILLIAM C. BAUMAN.
GEORGE BEAL HEUSTED.

REFERENCES CITED

The following references are of record in the file of this patent:

UNITED STATES PATENTS

| Number | Name | Date |
|---|---|---|
| 2,259,169 | Little | Oct. 14, 1941 |
| 2,341,907 | Cheetham | Feb. 15, 1944 |
| 2,354,672 | Eastes | Aug. 1, 1944 |
| 2,402,384 | Eastes | June 18, 1946 |